Aug. 12, 1958 W. J. BLEASE 2,847,009
DISPENSING LIQUIDS
Filed Dec. 20, 1954
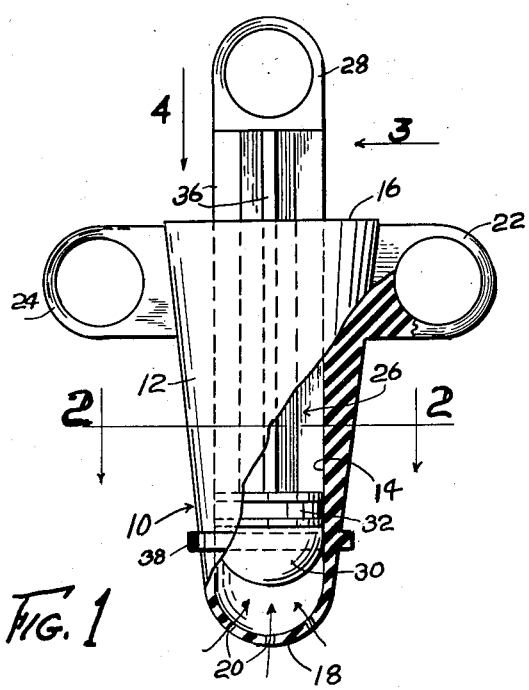
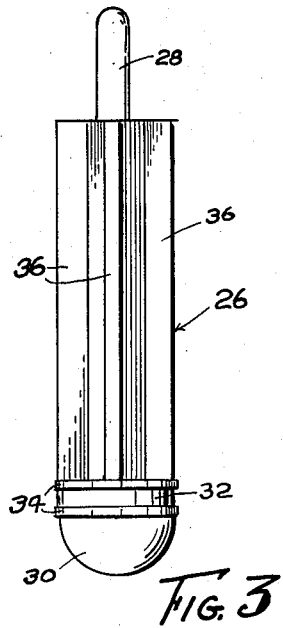
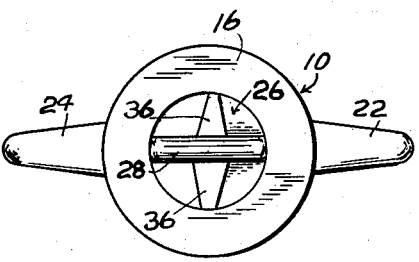
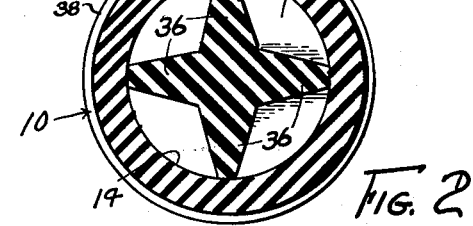
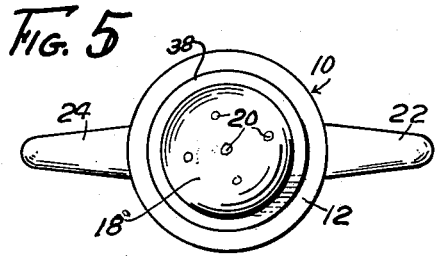
INVENTOR.
WILFRED J. BLEASE
BY

United States Patent Office 2,847,009
Patented Aug. 12, 1958

2,847,009

DISPENSING LIQUIDS

Wilfred J. Blease, Greenville, N. H.

Application December 20, 1954, Serial No. 476,242

2 Claims. (Cl. 128—222)

This invention relates to a new and improved dispenser particularly adapted for measuring and dispensing relatively small amounts of fluids, say for instance in the nature of a teaspoon or tablespoon, and the principal object of the present invention resides in the provision of a simplified two-part device including a barrel for insertion in liquid as in an open container or the neck of a bottle, and a plunger for taking in a specified amount of liquid into the device, and then expelling the measured amount of liquid, as for instance in dosage form directly into the mouth of a patient, infant, animal, etc., whether for administering medicaments or food products.

Another object of the invention resides in the provision of a device as above stated wherein the intake end of the device may have special shapes such as elongated, rounded or domed, and is easily insertable into the mouth of a human or animal for the purpose of directly discharging the contents of the measuring device therein without the necessity of using a spoon or other means for applying the material to the party receiving it, particularly to the end that such dosing is made much easier in the case of children and animals who can ordinarily be persuaded to insert a device such as a nipple in the mouth but who may often resist the application of a dose by means of a spoon.

A still further object of the invention resides in the provision of a two-part molded plastic device as above described which is particularly convenient and easy to operate, which is easily assembled and disassembled, and comprising a barrel tapered at the exterior surface thereof for accommodating bottle-necks of different sizes and allowing tipping up of the bottle itself without spilling in order to extract the last remaining amount of fluid therewithin.

Other objects and advantages of the invention will appear hereinafter.

Reference is to be had to the accompanying drawings, in which:

Fig. 1 is a view in front elevation illustrating the device, part being broken away and in section;

Fig. 2 is an enlarged section on line 2—2 of Fig. 1;

Fig. 3 is a view in elevation illustrating the plunger removed from the device and looking in the direction of arrow 3 in Fig. 1;

Fig. 4 is a top plan view of the device, looking in the direction of arrow 4 in Fig. 1; and Fig. 5 is a bottom plan view, looking in the direction of arrow 5 in Fig. 1.

The present device comprises two parts only, each part being molded of commercial plastic material, preferably polyethylene, which gives a desired closeness of fit between the parts for efficient operation thereof as will be made more apparent hereinafter. However, other materials could be used, and one part of the device might be molded of styrene and the other part of polyethylene or the like, glass, metal, aluminum, etc.

One of the parts is in the form of a barrel or elongated container like a nipple, and is generally indicated by the reference numeral 10. This part is preferably conical in shape as clearly shown in Fig. 1, having a tapering outer surface 12 but with a uniform inner cylindrical hollow indicated at 14. At its widest part as at 16, this container is open, at the end of the cylindrical portion 14, and at its narrow end it is substantially closed by a wide but thin walled rounded dome 18. This dome may be provided with a single hole or a series of small holes 20 for the entrance and exit of materials to be measured and expelled.

The dome portion 18 may be hemi-spherical as shown or it may assume any other shape useful for the particular purpose of the present invention. The material of the dome at 18 is thin and it will be seen in the sectioned part of Fig. 1 that the wall gradually thickens as it extends toward the wider end 16 of the conical container.

The sides of the conical container 10 are provided with finger-holds 22, 24 which are molded integrally therewith and these finger-holds may extend radially as shown and may assume any size, shape or position. The entire device 10 is molded in one piece as by injection molding.

The inner cylindrical portion 14 slidingly receives a plunger which is generally indicated at 26. This plunger is provided at one end with a finger or thumb-hold 28 which always extends outwardly from the barrel 10. The opposite end of the plunger is domed as indicated at 30 to fit the inside contour of the dome 18. The dome 30 terminates in a cylindrical portion 32 which is adapted to closely engage the inside surface of the cylinder 14 so as to provide for suction in the direction of the arrows in Fig. 1 when the plunger is moved from a position wherein it contacts the inner surface of dome 18 to the position shown in Fig. 1, or to a more retracted position for a larger amount of fluid.

If desired, the plunger may be molded with one or more narrow annular rings 34 extending slightly beyond the portion 32 to act as piston rings closely engaging the side wall at 14. These annular rings 34 might even be separately made but the device operates satisfactorily without them and they are not necessary to the successful operation of the invention.

The plunger 26 is preferably made in the form of radial wings 36 for the purpose of slidably guiding the plunger in its motion relative to the container portion 10 of the device and at the same time this will provide for lightness of weight and avoid excessive use of materials.

In the operation of the device, the dome portion 18 of the container 10 is thrust into an open container of liquid or the neck of a bottle, the plunger being pushed downwardly as far as it will go. The first two fingers of the hand may be located in the apertures in the finger-holds 22 and 24, and the thumb in the finger or thumb-hold 28, so that merely upon raising the thumb, fluid will be drawn into the dome-like portion 18 to any desired amount which may be indicated by convenient calibration if desired.

The device then being extracted from the bottle or open container, the dome-like portion 18 may be presented to the mouth of the person or animal who is to receive the fluid material. It is well known that infants and animals may be easily persuaded to accept a nipple-like object when they will not accept food or a dose of medicine by way of a spoon or cup or the like, and therefore it is seen that the present invention provides an easy pickup dispenser for accurately measuring an amount, holding it, and dispensing the same to the person or animal who is to receive it, in cooking, or for any other purpose.

The tapered exterior surface of the barrel or container portion 10 will provide for tightly fitting the mouth of a wide range of bottles of different sizes, so that the same may be tipped up to extract the last part of the contents thereof without spilling. The device is easily and expeditiously manipulated, being made of but two lightweight, molded plastic parts which are easily taken apart for cleaning or assembling for use. The consistency of the polyethylene of which at least one part should be made provides for a sufficient seal at the portion 32 of the plunger to provide the vacuum required to cause the fluid materials to enter the holes at 20 and to maintain the same in the device between the extraction from the bottle or container and the application thereof as described above. Also, when the required amount of fluid has been received within the dome-like portion 18, the entire device may be turned up so that the dome 18 is uppermost in order to maintain the fluid within the device.

The reference numeral 38 indicates a stop near the closed end of the cylinder or container to prevent entry thereof, into a cavity such as the mouth of a bottle or person, to too great an extent. This stop may take the form of an integral annular ring, as shown.

What I claim is:

1. A device of the class described comprising an elongated container portion having a hollow cylindrical interior opening at one end of the container, the opposite end of the container being provided with an entrance aperture, the apertured closed end of the container being blunt and rounded, a plunger in the cylinder, a piston on said plunger closely engaging the walls of the cylinder, and guide means on said plunger engaging the walls of the cylinder, said guide means being in the form of radially extending blades, and a finger-hold on said plunger extending outwardly from said container.

2. The device of claim 1 wherein the container has a conical outer surface extending from a minimum at the closed end thereof to a maximum at the open end thereof.

References Cited in the file of this patent

UNITED STATES PATENTS

| | | |
|---|---|---|
| 169,238 | Clotworthy | Oct. 26, 1875 |
| 388,249 | Blum | Aug. 21, 1888 |
| 850,357 | Doyle | Apr. 16, 1907 |
| 2,743,044 | Deemer et al. | Apr. 24, 1956 |

FOREIGN PATENTS

| | | |
|---|---|---|
| 116,079 | Great Britain | Aug. 8, 1918 |
| 447,741 | Great Britain | Aug. 21, 1934 |